(12) United States Patent
Matsuda et al.

(10) Patent No.: US 8,426,068 B2
(45) Date of Patent: Apr. 23, 2013

(54) METAL FOIL FOR SECONDARY BATTERY AND SECONDARY BATTERY

(75) Inventors: Noboru Matsuda, Toyama (JP); Hiroshi Furuki, Toyama (JP); Hideya Matsunaga, Toyama (JP)

(73) Assignee: Finecs Co., Ltd., Toyama (JP)

( * ) Notice: Subject to any disclaimer, the term of this patent is extended or adjusted under 35 U.S.C. 154(b) by 256 days.

(21) Appl. No.: 12/923,279

(22) Filed: Sep. 13, 2010

(65) Prior Publication Data

US 2011/0311877 A1    Dec. 22, 2011

(30) Foreign Application Priority Data

Jun. 17, 2010    (JP) .................. 2010-138271

(51) Int. Cl.
*H01M 4/72* (2006.01)
(52) U.S. Cl.
USPC ........................ 429/241; 429/233; 429/243
(58) Field of Classification Search .................. 429/241, 429/233, 243
See application file for complete search history.

(56) References Cited

U.S. PATENT DOCUMENTS 704,739 A    7/1902  Entz
7,601,464 B2 *  10/2009  Muraoka et al. ............. 429/243
2002/0025475 A1    2/2002  Matsumoto
2003/0180621 A1    9/2003  Matsumoto
2005/0019664 A1    1/2005  Matsumoto

FOREIGN PATENT DOCUMENTS

| EP | 1 291 943 A1 | 3/2003 |
|---|---|---|
| JP | 11-97031 A | 4/1999 |
| JP | 11-97034 A | 4/1999 |
| JP | 2002-198055 | 7/2002 |
| JP | 2002-216775 | 8/2002 |
| JP | 2003-17069 A | 1/2003 |

OTHER PUBLICATIONS

European Search report dated Oct. 21, 2011.

\* cited by examiner

*Primary Examiner* — Jane Rhee
(74) *Attorney, Agent, or Firm* — McGinn IP Law Group, PLLC

(57) ABSTRACT

A metal foil for secondary battery generating less cutting chips at the time of forming an opening and allowed to have a higher aperture ratio without reducing strength and a secondary battery in which short circuit caused by generation of electrode debris can be suppressed are provided. A metal foil 1 for secondary battery is provided with a metal thin plate 2, plural first convex portions 3A formed on a first principal surface 2a of the thin plate 2 by plastic forming and plural second convex portions 3B formed on a second principal surface 2b opposite to the first principal surface 2a by the plastic forming, wherein the convex portions 3A and 3B each have an opening 31 of which aperture plane 31a is orthogonal or substantially orthogonal to the principal surfaces 2a and the 2b.

20 Claims, 9 Drawing Sheets

METAL FOIL FOR SECONDARY BATTERY AND SECONDARY BATTERY

The present application is based on Japanese Patent Application No.2010-138271 filed on Jun. 17, 2010, the entire contents of which are incorporated herein by reference.

BACKGROUND OF THE INVENTION

1. Field of the Invention

The invention relates to a metal foil for secondary battery and a secondary battery.

2. Description of the Related Art

In recent years, along with the popularization of portable devices such as a cell phone or a laptop computer and along with the development and practical application of an electric vehicle or a hybrid car, demand of a compact high-capacity battery has been increasing. Especially a lithium-ion battery has been used in various fields due to its lightweight and high energy density.

The lithium-ion battery is basically composed of a cathode, an anode, a separator for insulating the cathode from the anode, and an electrolyte which permits ion movement between the cathode and the anode.

In general, a metal foil formed of a band-shaped aluminum foil in which an active material such as lithium cobalt oxide is applied to front and back surfaces thereof is used as the cathode. Meanwhile, a metal foil formed of a band-shaped copper foil in which an active material such as a carbon material is applied to front and back surfaces thereof is used as the anode.

When the active material is applied to the front and back surfaces of the copper or aluminum metal foil, there is a disadvantage that the metal foil is less likely to be integrated with the active material and the active material is likely to fall off. Therefore, a method is known in which the active material is prevented from falling off by forming a through-hole on the metal foil and integrating the active materials applied to the front and back surfaces of the metal foil through the through-hole (see JP-A 2002-198055).

Plural conical through holes are formed on front and back surfaces of the metal foil by a rolling process in which the metal foil is passed between a pair of rollers on which a conical convex portion is formed, thereby forming the metal foil in a three-dimensional shape.

Meanwhile, a method of forming through-holes by a lath process is known in which cuts are formed in a thin plate and the thin plate is extended in a direction orthogonal to the cutting direction (e.g., see JP-A 2002-216775).

However, since cutting chips are generated in the method of forming through-holes by the rolling process, removal of the cutting chips is required. Meanwhile, in the method of forming through-holes by the lath process, since strength against tension generated at the time of applying the active material is insufficient when the expansion rate is increased, it is not possible to increase the aperture ratio.

SUMMARY OF THE INVENTION

Therefore, it is an object of the invention to provide a metal foil for secondary battery generating less cutting chips at the time of forming an opening and allowed to have a higher aperture ratio without reducing strength, and a secondary battery in which short circuit caused by generation of electrode debris can be suppressed.

A metal foil for secondary battery according to an embodiment of the present invention is provided with a metal thin plate and plural convex portions which are formed on one principal surface of the thin plate by plastic forming and have openings of which aperture plane is orthogonal or substantially orthogonal to the one principal surface.

The plural convex portions may be formed on the one principal surface of the thin plate as well as on a principal surface opposite to the one principal surface.

The convex portion may be configured to have plural openings.

A slit may be formed on the convex portion by the plastic forming at the time of forming the opening.

A metal foil for secondary battery according to an embodiment of the present invention is provided with a metal thin plate and plural convex portions having an opening that is formed, associated with the plastic forming, by swelling of a region on one side of a cut line formed on the thin plate.

In a secondary battery according to an embodiment of the present invention, any of the above-mentioned metal foils for secondary battery is used as a cathode or anode base.

According to the metal foil for secondary battery of the present invention, a small amount of cutting chips is generated when an opening is formed and it is possible to increase an aperture ratio without reducing strength.

According to the secondary battery of the present invention, it is possible to suppress a short circuit caused by generation of electrode debris.

BRIEF DESCRIPTION OF THE DRAWINGS

Next, the present invention will be explained in more detail in conjunction with appended drawings, wherein:

FIGS. 1A and 1B show a metal foil for secondary battery according to a first embodiment of the present invention, wherein FIG. 1A is a perspective view of a principal part and FIG. 1B is a plan view thereof;

FIGS. 2A and 2B show a meta) foil for secondary battery according to a second embodiment of the present invention, wherein FIG. 2A is a perspective view of a principal part and FIG. 2B is a plan view thereof;

FIGS. 4A and 4B show a metal foil for secondary battery according to a fourth embodiment of the present invention, wherein FIG. 4A is a perspective view of a principal part and FIG. 4B is a plan view thereof;

FIGS. 5A to 5G show modifications of a convex portion, wherein FIGS. 5A to 5E are plan views and FIGS. 5F and 5G are perspective views.

DETAILED DESCRIPTION OF THE PREFERRED EMBODIMENTS

First Embodiment

Figure 1A:
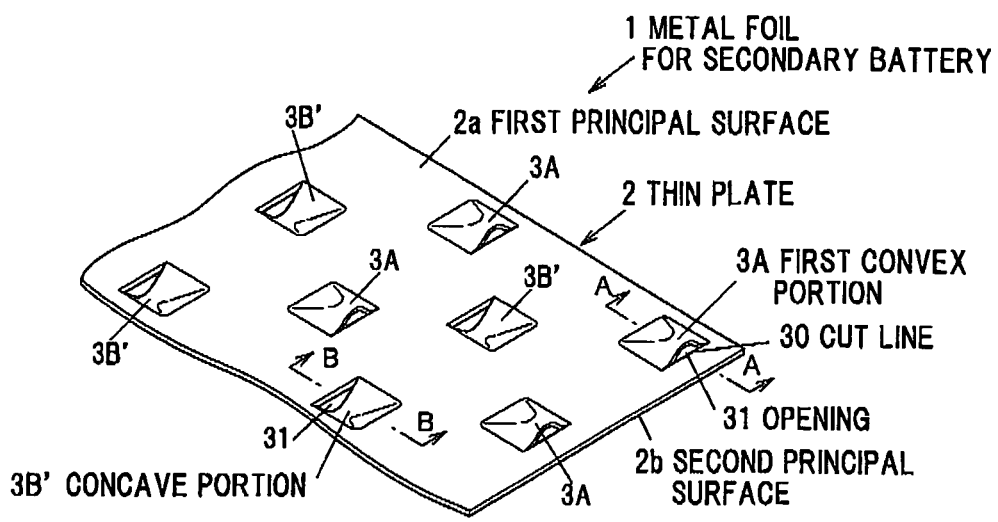
Figure 1B:
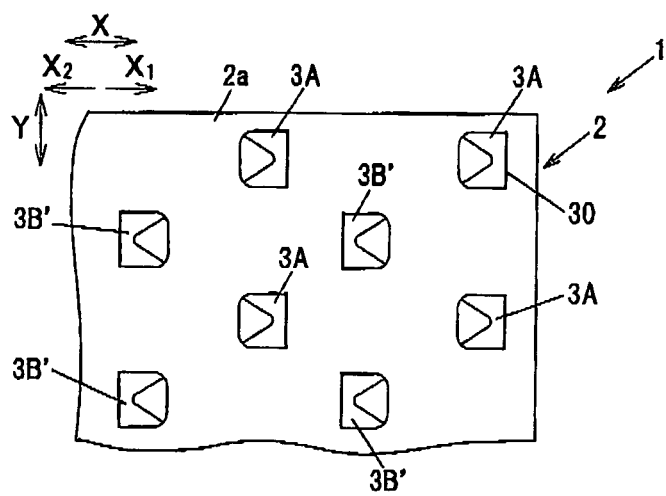
Figure 1C:
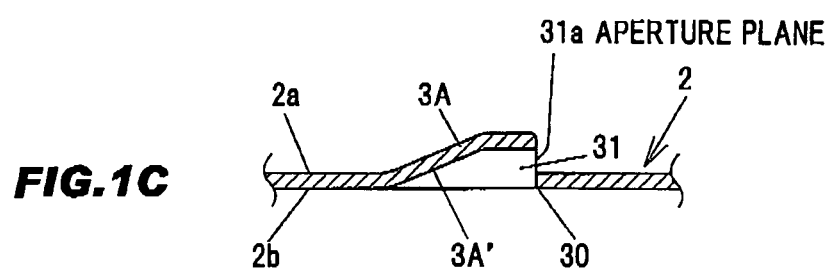
FIG. 1C is a cross sectional view taken on line A-A of FIG. 1A.
Figure 1D:
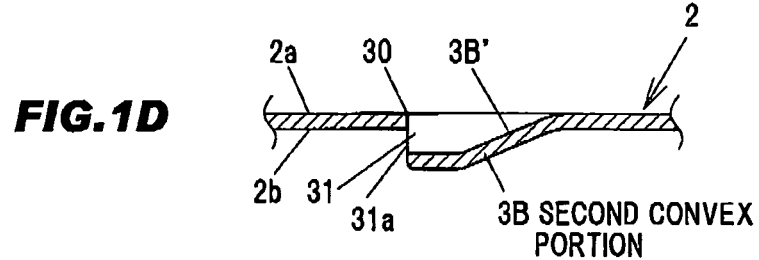
FIG. 1D is a cross sectional view taken on line B-B of FIG. 1A
Figure 1E:
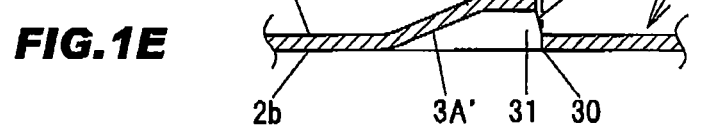
FIG. 1E is a cross sectional view showing a modification of FIG. 1C.

FIGS. 1A and 1B show a metal foil for secondary battery according to a first embodiment of the present invention, wherein FIG. 1A is a perspective view of a principal part and FIG. 1B is a plan view thereof. FIG. 1C is a cross sectional view taken on line A-A of FIG. 1A, FIG. 1D is a cross sectional view taken on line B-B of FIG. 1A and FIG. 1E is a cross sectional view showing a modification of FIG. 1C.

A metal foil 1 for secondary battery is provided with a metal thin plate 2 and plural first and second convex portions 3A and 3B respectively integrally formed on a first principal surface 2a of the thin plate 2 and on a second principal surface 2b opposite to the first principal surface 2a. Alternatively, the convex portion may be formed only on one principal surface.

The thin plate 2 is formed of metal such as, e.g., aluminum, copper, nickel, an alloy thereof or nickel-plated steel plate. In addition, the thin plate 2 has a thickness of, e.g., 20-100 μm. A planar shape of the thin plate 2 is a band-like shape or a rectangular shape depending on the secondary battery.

On the thin plate 2, linear cut lines 30 are formed, and the convex portions 3A and 3B are formed by the plastic forming. The length of the cut line 30 is, e.g., 0.2-0.3 mm. Note that, the cut line 30 is not limited to be linear.

The first convex portion 3A is formed on the first principal surface 2a and the second convex portion 3B is formed on the second principal surface 2b. The first convex portion 3A is also a concave portion 3A' when viewed from the second principal surface 2b and the second convex portion 3B is also a concave portion 3B' when viewed from the first principal surface 2a. In addition, the convex portions 3A and 3B have an opening 31 of which aperture plane 31a is orthogonal to the principal surfaces 2a and 2b, as shown in FIGS. 1C and 1D. The convex portions 3A and 3B are, e.g., 0.05-0.2 mm in height. The number of openings per convex portion is not limited to one, and the convex portion may have two or three or more openings. Alternatively, the aperture plane 31a may be substantially orthogonal to the principal surface 2a (e.g., within an inclination angle θ of ±15°), as shown in FIG. 1E.

A row of the first convex portions 3A and a row of the second convex portions 3B are alternately arranged, and the overall array of the convex portions 3A and 3B is staggered. The opening 31 of the convex portion 3A is opened toward a direction $X_1$ which is one of row directions X, and the opening 31 of the convex portion 3B is opened toward a direction $X_2$ which is another row direction X.

Method of Forming the Convex Portion

A region on one side of a cut line 30 formed on the thin plate 2 is swollen associated with the plastic forming, thereby forming the convex portions 3A and 3B. In detail, the convex portions 3A and 3B can be formed by a rolling process in which the thin plate 2 is passed between a metal roll having a convex portion formed on the surface thereof and a roll of which surface is formed of an elastic member such as rubber.

Alternatively, it is possible to form the convex portions 3A and 3B by press working in which the thin plate 2 is inserted between a lower metal table having convex and concave portions formed on the upper surface thereof and an upper metal table having concave and convex portions formed on the lower surface thereof at positions corresponding to the convex and concave portions of the lower table, and the upper table is pressed against the lower table, A tong hold with a width of about several mm without having the convex portions 3A and 3B may be formed for conveying the thin plate 2 in the vicinity of the sides of the thin plate 2 facing each other.

Effect of the Present Embodiment

According to the present embodiment, following effects are achieved.

(a) As compared with the case where the through-hole is formed by the rolling process or the press working, no cutting chips is generated at the time of forming the opening 31, or even if generated, the generation of the cutting chips can be suppressed to a small amount. Therefore, the removal of the cutting chips is seldom necessary, thereby enhancing productivity of the metal foil for secondary battery.

(b) When the active material is applied to both surfaces of the metal foil for secondary battery, the active material gets inside the convex portions 3A and 3B and the active materials applied to the both principal surfaces 2a and 2b are integrated through the opening 31, thus, it is possible to improved adhesion of the active material, (c) It is possible to change the aperture ratio by adjusting heights of the convex portions 3A and 3B, which is relatively easy adjustment (d) Since the opening 31 can be formed without reducing the volume and surface area of the thin plate 2, it is possible to increase the aperture ratio without reducing the strength as compared with the lath process.

Second Embodiment

Figure 2A:
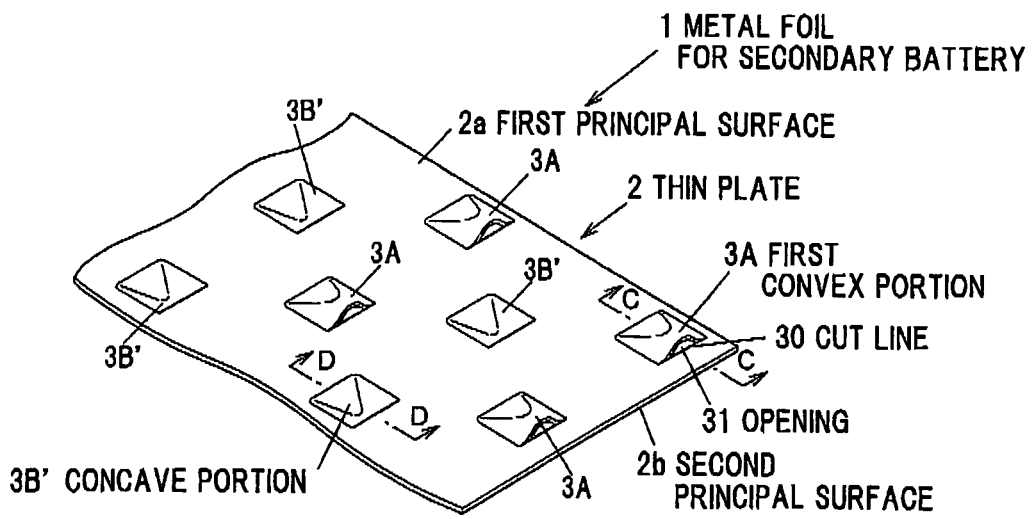
Figure 2B:
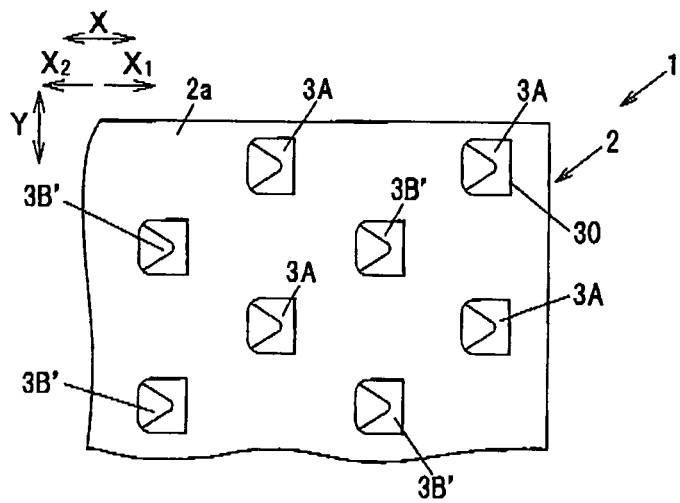
Figure 2C:
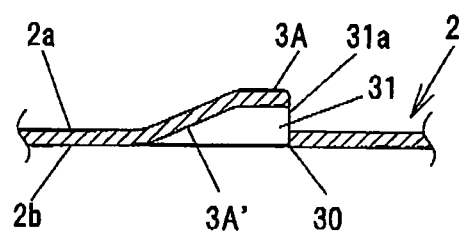
FIG. 2C is a cross sectional view taken on line C-C of FIG. 2A
Figure 2D:
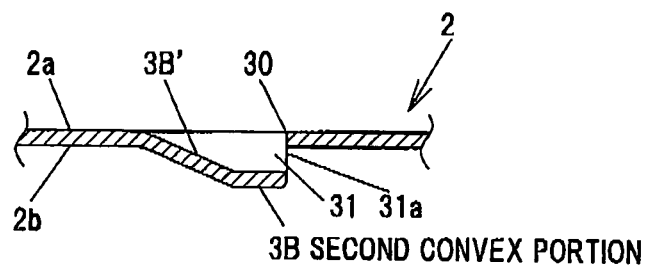
FIG. 2D is a cross sectional view taken on line D-D of FIG. 2A.

FIGS. 2A and 2B show a metal foil for secondary battery according to a second embodiment of the present invention, wherein FIG. 2A is a perspective view of a principal part and FIG. 2B is a plan view thereof. FIG. 2C is a cross sectional view taken on line C-C of FIG. 2A and FIG. 2D is a cross sectional view taken on line D-D of FIG. 2A.

The present embodiment is configured in the same manner as the first embodiment except that the opening 31 of the second convex portion 3B formed on the second principal surface 2b is opened in the same direction as the opening 31 of the first convex portion 3A formed on the first principal surface 2a. The manufacturing in the second embodiment can be carried out in the same manner as the first embodiment, and the second embodiment achieves the same effect as the first embodiment.

Third Embodiment

Figure 3:
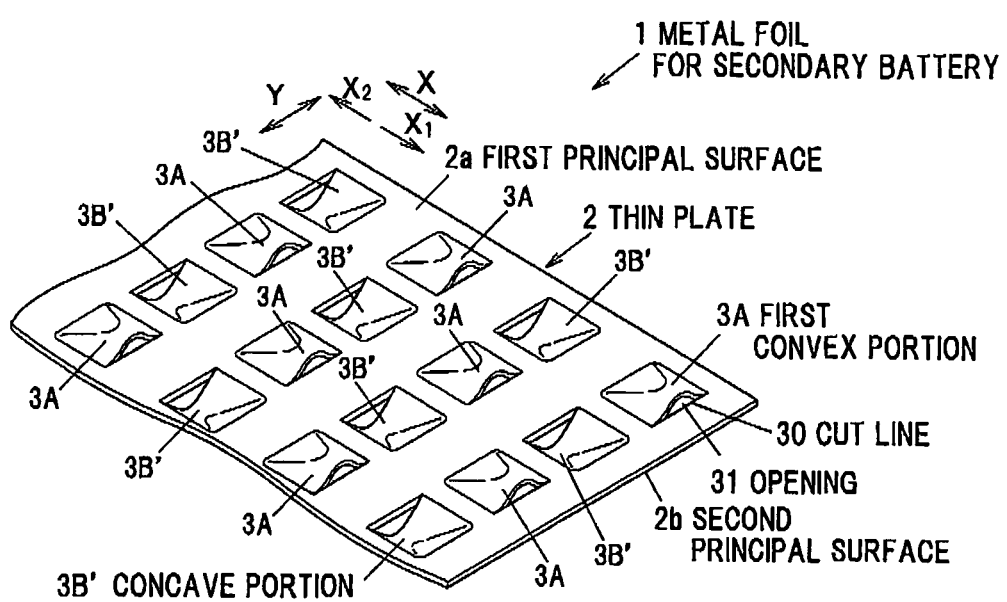
FIG. 3 is a perspective view of a principal part of a metal foil for secondary battery according to a third embodiment of the present invention.

FIG. 3 is a perspective view of a principal part of a metal foil for secondary battery according to a third embodiment of the present invention. The present embodiment is configured in the same manner as the first embodiment except that the convex portions are arranged in a grid pattern (matrix pattern) in a row direction X as well as a column direction Y.

Plural first convex portions 3A are formed in a staggered manner on the first principal surface 2a of the thin plate 2 and plural convex portions 3B are arranged in a staggered manner on the second principal surface 2b so as to be located between the first convex portions 3A, thereby arranging the convex portions 3A and 3B in a grid pattern (matrix pattern) in the row direction X as well as the column direction Y. The opening 31 of the convex portion 3A is opened toward a direction $X_1$ which is one of row directions X, and the opening 31 of the convex portion 3B is opened toward a direction $X_2$ which is another row direction X.

The manufacturing in the third embodiment can be carried out in the same manner as the first embodiment, and the aperture ratio can be more than the first and second embodiments.

Fourth Embodiment

Figure 4A:
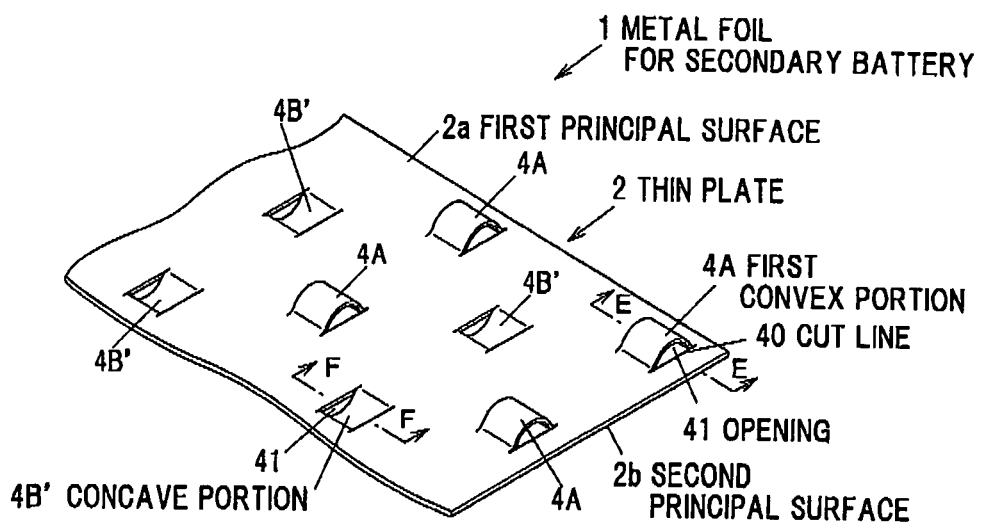
Figure 4B:
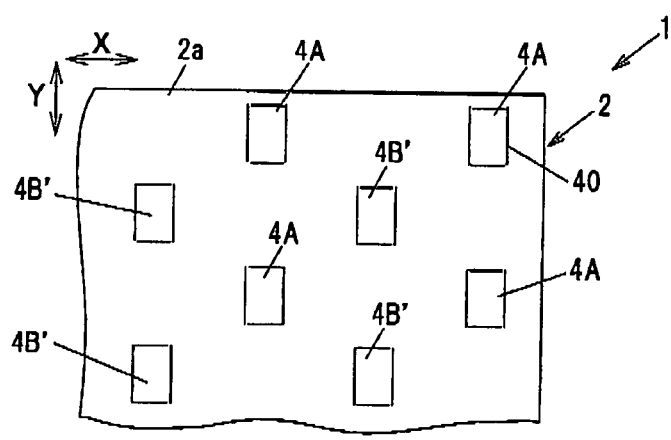
Figure 4C:
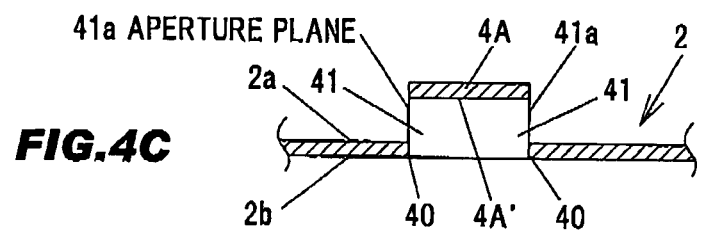
FIG. 4C is a cross sectional view taken on line E-E of FIG. 4A
Figure 4D:
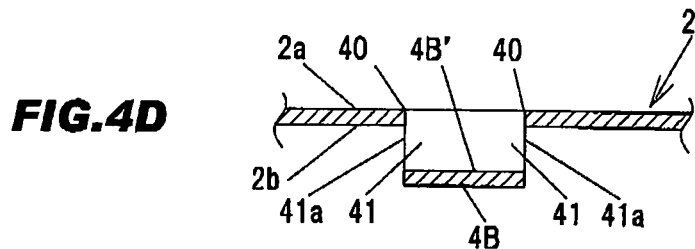
FIG. 4D is a cross sectional view taken on line F-F of FIG. 4A.

FIGS. 4A and 4B show a metal foil for secondary battery according to a fourth embodiment of the present invention, wherein FIG. 4A is a perspective view of a principal part and FIG. 4B is a plan view thereof. FIG. 4C is a cross sectional view taken on line E-E of FIG. 4A and FIG. 4D is a cross sectional view taken on line F-F of FIG. 4A.

The present embodiment is configured in the same manner as the first embodiment except that the shape of the convex portion is changed compared with the first embodiment.

A first convex portion 4A is formed on the first principal surface 2a and a second convex portion 4B is formed on the second principal surface 2b. The convex portions 4A and 4B each have a pair of openings 41 at positions facing each other. An aperture plane 41a of the opening 41 is orthogonal or substantially orthogonal to the principal surfaces 2a and 2b in the same manner as the first embodiment.

The manufacturing in the fourth embodiment can be carried out in the same manner as the first embodiment, and the fourth embodiment achieves the same effect as the first embodiment.

Modifications of the Convex Portion

Figure 5A:
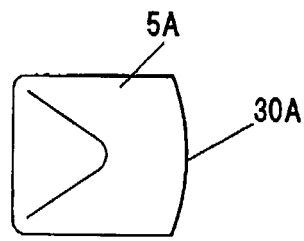
Figure 5B:
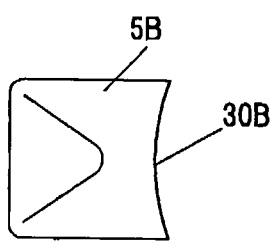
Figure 5C:
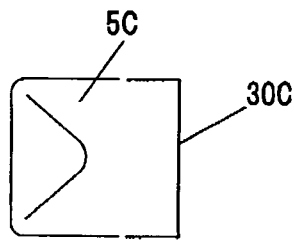
Figure 5D:
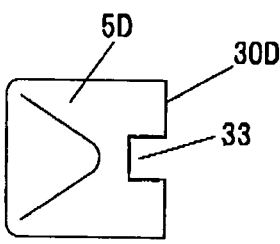
Figure 5E:
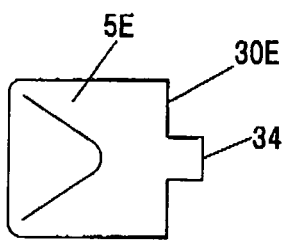
Figure 5F:
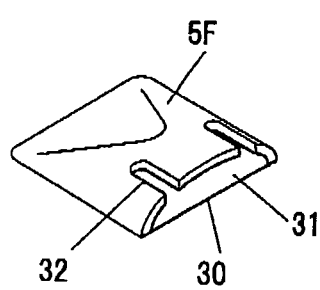
Figure 5G:
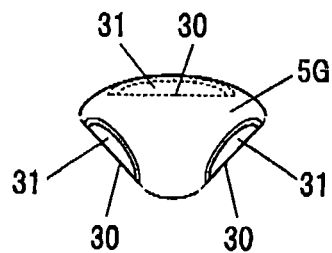

FIGS. 5A to 5G show modifications of a convex portion, wherein FIGS. 5A to 5E are plan views and FIGS. 5F and 5G are perspective views.

A cut line 30A configured to form a convex portion 5A may be in an outwardly expanding arc shape as shown in FIG. 5A, and a cut line 30B configured to form a convex portion 5B may be in an inwardly expanding arc shape as shown in FIG. 5B. In addition, a cut line 30C configured to form a convex portion 5C may be in a squared U-shape or a U-shape as shown in FIG. 5C. In addition, a cut line 30D configured to form a convex portion 5D may have an inwardly protruding portion 33 at a middle portion thereof as shown in FIG. 5D and a cut line 30E configured to form a convex portion 5E may have an in outwardly protruding portion 34 at a middle portion thereof as shown in FIG. 5E.

As shown in FIG. 5F, a crack (or a slit) 32 may be formed on a convex portion 5F by the plastic forming. The cutting chips are not generated at all from the convex portion 5F, or even if generated, the generation of the cutting chips can be suppressed to a small amount. In addition, as shown in FIG. 5G, three openings 31 may be formed by forming three cut lines 30 per convex portion 5E.

Fifth Embodiment

Figure 6:
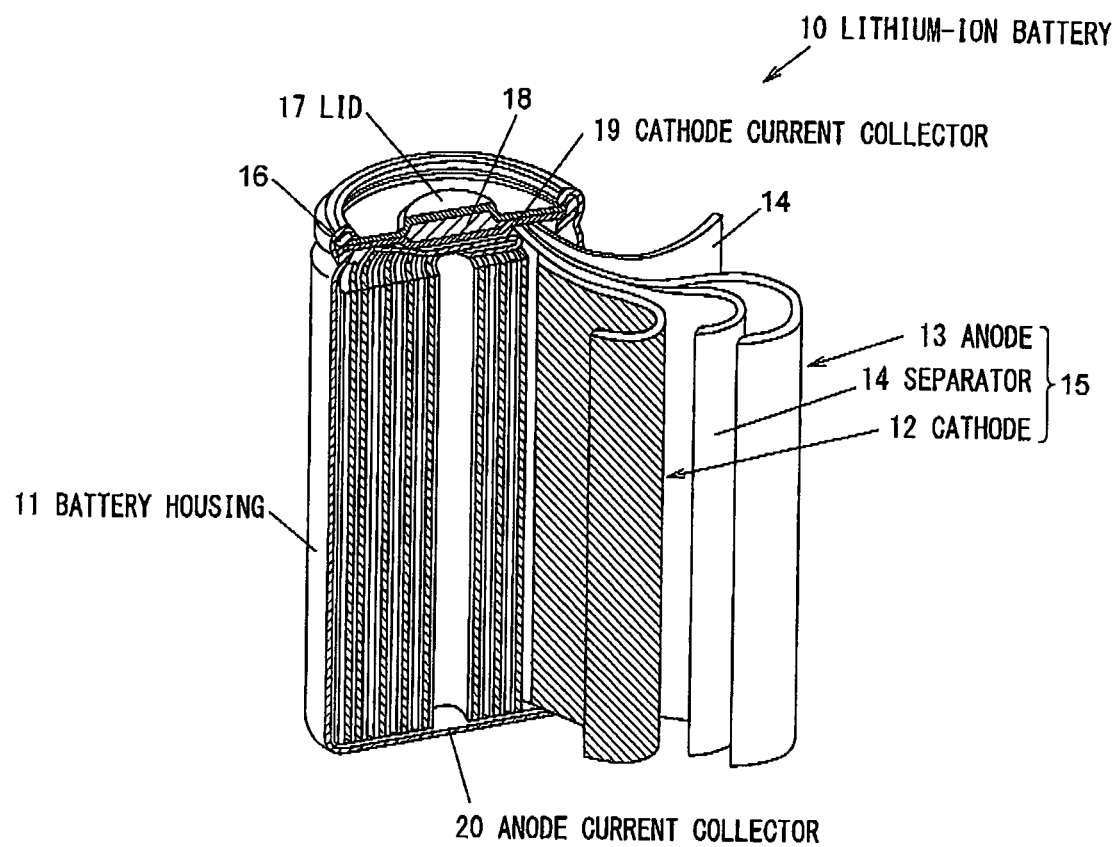
FIG. 6 is a partially broken perspective view showing a lithium-ion battery according to a fifth embodiment of the present invention.

FIG. 6 is a partially broken perspective view showing a lithium-ion battery according to a fifth embodiment of the present invention.

A lithium-ion battery 10 is provided with a round battery housing 11 having a bottom portion 11a, an electrode group 15 which is housed in the battery housing 11 and in which a cathode 12 and an anode 13 are spirally wound via a separator 14, an electrolyte filled in the battery housing 11, and a lid 17 having a rubber valve 18 configured to close an opening of the battery housing 11 via a gasket 16.

The cathode 12 is the metal foil 1 according to the above-mentioned first to fourth embodiments processed into a band-like electrode base in a required size having an active material applied to the both surfaces thereof, and an upper end of the electrode base is electrically connected to the lid 17 via a cathode current collector 19. Alternatively, the cathode 12 may have a structure in which the upper end of the electrode base is directly connected to the lid 17 without using the cathode current collector 19.

The anode 13 is the metal foil 1 according to the above-mentioned first to fourth embodiments processed into a band-like electrode base in a required size having an active material applied to the both surfaces thereof, and a lower end of the electrode base is electrically connected to the bottom portion 11a of the battery housing 11 via an anode current collector 20. Alternatively, the anode 13 may have a structure in which the lower end of the electrode base is directly connected to the bottom portion 11a of the battery housing U without using the anode current collector 20.

As for the active material, for example, lithium cobalt oxide is used for the cathode, a carbon material is used for the anode and a conduction aid or a binder, etc., is appropriately added thereto.

For the separator 14, it is possible to use a porous film formed of, e.g., polyethylene or polypropylene, etc.

For the electrolyte, for example, lithium salt dissolved in an organic solvent is used.

According to the lithium-ion battery in the present embodiment, it is possible to reduce the falling of the electrode debris from the electrode base, thereby allowing suppression of the short circuit between the electrodes.

It should be noted that the present invention is not intended to be limited to the above-mentioned embodiments, and the various kinds of embodiments can be implemented without departing from the gist of the present invention. For example, although the lithium-ion battery is described in the above-mentioned fifth embodiment, the present invention can be applied to other secondary batteries such as nickel-Metal hydride battery (Ni/MH battery) or to a rectangular secondary battery. When the present invention is applied to, e.g., a rectangular battery, the metal foil 1 according to the first to fourth embodiments is processed into a rectangular electrode base, a cathode and an anode are formed by applying active materials to both surfaces of the electrode base, an electrode group is formed by laminating the cathode and the anode via a separator and the electrode group is housed in a rectangular battery housing, thereby manufacturing the rectangular battery.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. A metal foil for secondary battery, comprising:
    a metal thin plate; and
    a plurality of convex portions that are formed on one principal surface of the thin plate by plastic forming, include an opening of which an aperture plane is orthogonal or substantially orthogonal to the one principal surface, and are asymmetrical across a line passing through a center thereof which is parallel to the aperture plane.

2. The metal foil for secondary battery according to claim 1, wherein the plurality of convex portions are formed on the one principal surface of the thin plate as well as on a principal surface opposite to the one principal surface.

3. The metal foil for secondary battery according to claim 1, wherein the convex portion comprises a plurality of openings.

4. The metal foil for secondary battery according to claim 1, wherein a slit is formed on the convex portion by the plastic forming at the time of forming the opening.

5. A metal foil for secondary battery, comprising:
    a metal thin plate; and
    a plurality of convex portions including an opening that is formed, associated with the plastic forming, by swelling of a region on one side of a cut line formed on the thin plate. and which are asymmetrical across a line passing through a center thereof which is parallel to the cut line.

6. The metal foil for secondary battery according to claim 5, wherein the plurality of convex portions are formed on the one principal surface of the thin plate as well as on a principal surface opposite to the one principal surface.

7. The metal foil for secondary battery according to claim 5, wherein the convex portion comprises a plurality of openings.

8. The metal foil for secondary battery according to claim 5, wherein a slit is formed on the convex portion by the plastic forming at the time of forming the opening.

9. A secondary battery, comprising:
 a metal foil for secondary battery comprising a metal thin plate and a plurality of convex portions having an opening that is formed, associated with the plastic forming, by swelling of a region on one side of a cut line formed on the thin plate such that the plurality of convex portions are asymmetrical across a line passing through a center thereof and parallel to the cut line,
 wherein the metal foil for secondary battery is used as a cathode or anode base.

10. The secondary battery according to claim 9, wherein the plurality of convex portions are formed on the one principal surface of the thin plate as well as on a principal surface opposite to the one principal surface.

11. The secondary battery according to claim 9, wherein the convex portion comprises a plurality of openings.

12. The secondary battery according to claim 9, wherein a slit is formed on the convex portion by the plastic forming at the time of forming the opening.

13. The secondary battery according to claim 1, wherein a side of the plurality of convex portions opposite the opening is closed.

14. The secondary battery according to claim 1, wherein the opening is the only opening in a convex portion of the plurality of convex portions which communicates from the one principal surface of the thin plate to a principal surface opposite to the one principal surface of the thin plate.

15. The secondary battery according to claim 1, wherein the opening is formed on a single side of the plurality of convex portions.

16. The secondary battery according to claim 1, wherein a height of a convex portion of the plurality of convex portions from a portion of the metal thin plate without the plurality of convex portions varies along a line perpendicular to the aperture plane.

17. The secondary battery according to claim 1, wherein the aperture plane has an inclination in a range of +15 degrees to −15 degrees to the one principal surface.

18. The secondary battery according to claim 1, wherein a size of the opening decreases as the opening extends from the aperture plane.

19. The secondary battery according to claim 1, wherein a shape of a cross-section of a convex portion of the plurality of convex portions is irregular as the convex portion extends away from the aperture plane.

20. The secondary battery according to claim 1, wherein a height of a convex portion of the plurality of convex portions decreases as the convex portion extends away from the aperture plane.

* * * * *